Dec. 27, 1927.
L. EMANUELI
1,653,895
HIGH TENSION CABLE JOINT AND METHOD OF MAKING THE SAME
Filed Nov. 19, 1926
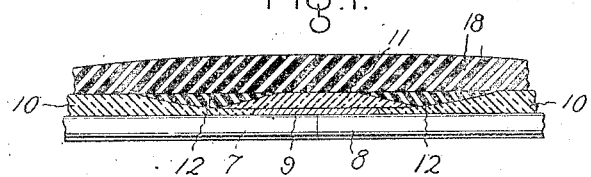
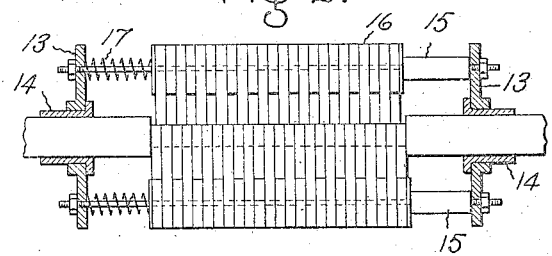
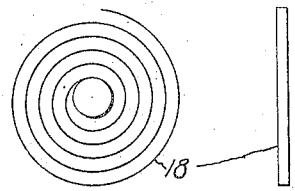
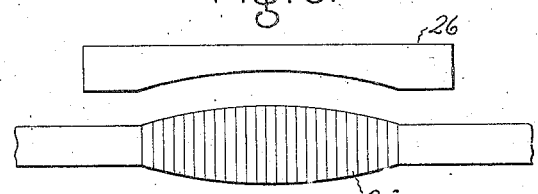
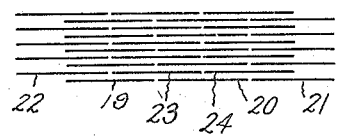
Inventor:
Luigi Emanueli,
by Emil Bönnelyke
His Attorney.

Patented Dec. 27, 1927.

1,653,895

UNITED STATES PATENT OFFICE.

LUIGI EMANUELI, OF MILAN, ITALY, ASSIGNOR TO SOCIETA ITALIANA PIRELLI, OF MILAN, ITALY, A CORPORATION OF ITALY.

HIGH-TENSION-CABLE JOINT AND METHOD OF MAKING THE SAME.

Application filed November 19, 1926. Serial No. 149,447.

The present invention relates to joints for uniting sections of underground cables or conductors designed to carry high tension currents. The higher the voltage the greater are the difficulties in properly insulating the joints. Briefly, such a cable comprises a conductor, an insulated covering such as impregnated paper, and a lead sheath. In joining the ends of two adjacent sections, the lead sheath is cut back for a certain distance, the insulation is cut away, usually on a taper to expose the ends of the conductors, and the said ends are united by a sleeve connector which is soldered thereto. After this insulation is applied around the connector and the adjacent portions of the permanent or factory-wound insulation until the desired thickness is obtained. The insulation so applied is in the form of thin, narrow tape, usually paper, which has previously been impregnated with a suitable compound. Such joints, for a cable designed to carry current at 130,000 volts, for example, are commonly as much as 36 inches long and have a diameter at the center of approximately 6 inches. To make such a joint requires approximately 4500 feet of thin, one inch tape. Great care must be exercised in making these joints, to prevent moisture from getting into the joint and also to avoid any traces of acidity on the tape from the hands of the jointer, as it is well known that both of these things noticeably reduce the breakdown voltage of the joint. These joints are commonly made in manholes in the street where moisture is liable to collect, and so great is the danger from moisture that the common practice is to complete the joint the same day the work is started no matter how long it may take. It is desirable in many cases, to sufficiently heat the atmosphere surrounding the joint to prevent the accumulation of moisture. The foregoing, while only briefly indicating some of the conditions surrounding cable jointing, will suffice to show the care which must be exercised in this class of work.

The practice heretofore has been to wind one tape at a time on the joint from a roll of convenient size and when the roll is exhausted, use other rolls in succession. The tape from each roll is wound around the joint with each succeeding turn partly overlapping the preceding one, and when done resembles in appearance a screw thread, the layer thus formed extending from one end of the joint to the other. A second layer is then wound over the first, and if the first was wound from right to left, then the second will be wound from left to right. This action is repeated until the necessary amount of tape has been applied. As such a taped joint is thicker at the center than at the ends, the axial length of the successive layers after the first few will be progressively less from the ends toward the center. In such taping there are bound to be small voids in the region of the overlaps which as well understood, are objectionable, forming as they do, a source of weakness.

I have invented or discovered a new type of joint and a new way for taping it which effects a great saving of time and labor and at the same time produces a construction in which the danger due to voids is reduced to a minimum.

In brief, I accomplish this by simultaneously winding a plurality of tapes round and round the conductor each in a plane perpendicular to the axis thereof after the fashion of a clock spring, as distinguished from winding the tape from end to end of the joint in the form of a long screw thread. By winding one-half of the tape from contacting rolls located in one side of the conductor and the remainder from similar rolls on the opposite side and in overlapping relation to the first, the edges of each turn will be in abutting relation and the joints thus formed in one layer will be covered by the turns of the second and so on. In this manner, all of the turns or layers will be completely interlocked with the others.

In the accompanying drawing which is illustrative of my invention, Fig. 1 is a partial longitudinal view of a joint which is to be taped; Fig. 2 is a diagrammatic view of a machine for winding the tape; Fig. 3 is a view of a template used in shaping the joint; Fig. 4 is a view of a completely taped joint; Figs. 5, 6 and 7 are diagrammatic views showing how the tape is wound.

7 and 8 indicate the sections of a conductor which are to be united and taped and 9 the sleeve connector which is soldered thereto. 10 indicates the factory wound insulation, 11 a relatively long, tapered sheet of paper or equivalent insulation which is wrapped around the connector and adjacent ends of the factory insulation and 12 are tapes which fill in the space between the ends of the tapered sheet and the factory wound insulation, so that a cylindrical surface is presented for the final taping 18.

As above stated, a large number of tapes usually of impregnated paper, are simultaneously wound to form the joint. To do this, a carrier is provided comprising a pair of heads 13 which are rotatable on two bearings 14 which are clamped on the lead sheathed ends of the cable. The heads are held in spaced relation by rods 15. Surrounding the rods are tubes on which are rotatably mounted rolls of paper tape 16 which have been treated with insulating compound in the usual manner. Tension is imparted to the tapes by springs 17 which press the rolls into sidewise contact. By preference alternate rolls on each spindle or support are caused to rotate in opposite directions thereby obtaining the benefit of the friction between them. This is accomplished by feeding the tape from the top of one roll and the bottom of the adjacent roll. The complete apparatus or machine is disclosed in my companion application, No. 149,446, filed of even date herewith, and claims therefor are included in that application.

In assembling the rolls of tape on the carrier one set is positioned a little nearer to one end head than the other so that during the winding operation the tapes applied from one set of rolls will be overlapped by those from the second set.

As above pointed out, the tape 18 from each roll is wound in a spiral around the joint to form layers, the sides of the spiral being in planes perpendicular to the axis of the conductor as indicated in Fig. 5. To state the matter another way, the tape is wound like a clock spring instead of being wound in the form of a screw thread as has been the previous practice. The tapes when wound on the conductor have the relation shown diagrammatically in Fig. 7. In this figure, 19, 20 and 21 represent the tapes from three rolls. In practice, the edges of these tapes are in edgewise contact but for clearness of illustration they are shown with small spaces between. All of these tapes are taken from one set of rolls. The tapes 22, 23 and 24 which surround the first-mentioned tapes are taken from the second set of rolls and are offset axially by one-half the width of the tape so that the central portion of the body covers the joints between turns of the under tapes. These tapes are also in edgewise contact although for the purposes of illustration, they are slightly spaced apart. The succeeding turns are applied in the same manner until the desired amount of tape has been applied. Although the tape from each roll occupies such a position on the conductor joint that the edges of all the turns occupy parallel planes perpendicular to the axis thereof, there are no exposed openings or spaces because of the interlocking or overlapping of one spiral with the other. The tapes lie flat on each other with the edges in contact and because of this, the formation of voids such as occur in wrappings of the screw thread type where each turn partly overlaps the preceding turn of the same tape, is prevented.

In Fig. 4 is shown a completely taped joint 25, and in Fig. 3 a template 26 by means of which the jointer can determine the proper size and shape of the finished joint.

In practice the carrier is provided with two sets of rolls usually located on spindles 180° apart, and these rolls are all mounted in place before the taping operation begins. The jointer applies the ends of the tape to the joint, there being sufficient adhesive for the purpose either on the joint or on the tape. The carrier is then slowly rotated by hand gradually increasing the diameter of the joint. When the tapes at the ends touch the template 26 the jointer tears off the end tapes and subsequently tears off the succeeding tapes as they touch the template due to the increase of diameter of the wound joint. Due to the overlapping of the tapes mentioned in connection with Fig. 7, the tapes as they are severed, will be held in place by the overlying turn until the center tape is reached and this may be fastened down by an adhesive.

The use of a large number of tapes which are simultaneously applied in the manner specified, very greatly decreases the time required to make a joint, and the handling of the tape by the jointer is reduced to a minimum. By using rolls of the proper size enough tape can be mounted on the carrier to complete the joint in one operation. The end rolls may be made smaller than the central rolls but as this involves a selection of rolls and hence extra labor, it is preferable to use rolls of the same size and scrap the unused material. The interlocking of all of the tapes results in a joint which is both electrically and mechanically satisfactory.

After the joint is completed, it is inclosed in a closed metallic casing as is customary and suitable compound forced into the casing to fill the space between it and the exterior of the taped joint.

What I claim as new and desire to secure by Letters Patent of the United States, is:—

1. In a joint for electrical conductors, the combination of a metal connector which unites the conductors with a wrapping which surrounds the joint and comprises a plurality of insulating tapes arranged side by side, each of which is spirally wrapped around the joint to form layers with the edges of each tape occupying parallel planes perpendicular to the axes of the conductors, the tapes in one layer breaking joint with those in the layers both inside and outside.

2. In a joint for electrical conductors, the combination of a metal conductor which unites the conductors with a wrapping which surrounds the joint and comprises a plurality of insulating tapes arranged side by side and all wound in the same direction, the edges of the tapes in each layer being in abutting relation and occupying parallel planes which are perpendicular to the axis of the conductors, the joints between tapes in each inner layer being covered by the tapes of the next outer layer.

3. In a joint for electrical conductors, the combination of a metal connector which unites the conductors, a body of insulation which surrounds the connector and a portion of the insulation on the conductors, and insulating tapes which are wrapped around the said insulation in sets to form spiral layers, the edges of each tape occupying parallel planes perpendicular to the axes of the conductors, the tapes of one set being in overlapping relation with those of the other set.

4. The method of insulating the joints of electrical conductors which comprises simultaneously winding sets of insulating tapes from separate sources around the conductor, to form spirals with the edges of each tape occupying parallel planes perpendicular to the axis of the conductors with the tapes from one source overlapping the joints between tapes from the other source.

In witness whereof, I have hereunto set my hand this 16 day of November, 1926.

LUIGI EMANUELI.